United States Patent
Martin

(10) Patent No.: US 12,271,239 B2
(45) Date of Patent: Apr. 8, 2025

(54) METHOD AND SYSTEM FOR REGISTERING DEVICES

(71) Applicant: Synaptics Incorporated, San Jose, CA (US)

(72) Inventor: Christopher James Martin, Cambridge (GB)

(73) Assignee: Synaptics Incorporated, San Jose, CA (US)

( * ) Notice: Subject to any disclaimer, the term of this patent is extended or adjusted under 35 U.S.C. 154(b) by 162 days.

(21) Appl. No.: 17/560,157

(22) Filed: Dec. 22, 2021

(65) Prior Publication Data

US 2023/0195183 A1    Jun. 22, 2023

(51) Int. Cl.
  G06F 1/16      (2006.01)
  B64U 10/13     (2023.01)
  B64U 101/30    (2023.01)
  G06F 3/14      (2006.01)
  G06F 21/73     (2013.01)

(52) U.S. Cl.
  CPC .......... G06F 1/1686 (2013.01); B64U 10/13 (2023.01); G06F 1/1605 (2013.01); G06F 1/1632 (2013.01); G06F 3/1423 (2013.01); G06F 21/73 (2013.01); *B64U 2101/30* (2023.01); *G06F 2221/2111* (2013.01)

(58) Field of Classification Search
  None
  See application file for complete search history.

(56) References Cited

U.S. PATENT DOCUMENTS

| 8,264,570 | B2 * | 9/2012 | Karimoto | H04N 1/00204 |
| | | | | 348/333.02 |
| 11,522,958 | B1 * | 12/2022 | Pope | H04L 67/52 |
| 2020/0001998 | A1 * | 1/2020 | Rao | G01S 19/42 |
| 2021/0152422 | A1 * | 5/2021 | Butler | G06K 19/06037 |
| 2021/0158921 | A1 * | 5/2021 | Panchal | G16H 80/00 |

FOREIGN PATENT DOCUMENTS

JP    2014013512 A  *  1/2014
KR    102238123 B1  *  4/2021

OTHER PUBLICATIONS

English Translation of JP-2014013512-A is provided (Year: 2014).*
English Translation of KR 102238123 B1 is provided (Year: 2021).*
Combined Search and Examination Report, dated Jun. 15, 2023, from UK Patent Application No. GB2219214.0, pp. 1-5.

* cited by examiner

*Primary Examiner* — Nurun Flora
(74) *Attorney, Agent, or Firm* — Paradice & Li LLP

(57) ABSTRACT

A method performed by a device registration server is disclosed. The method may include receiving, from a mobile device, location information and data associated with at least one image displayed on at least one display coupled to and co-located with a device, the image being captured by the mobile device. The location information may indicate a location of the mobile device when the at least one image was captured by the mobile device. The method may further include determining that the data received from the mobile device includes device information associated with the device. The method may also include registering the device coupled to and co-located with the at least one display based on the location information and the data received from the mobile device.

18 Claims, 4 Drawing Sheets

METHOD AND SYSTEM FOR REGISTERING DEVICES

FIELD

The present application relates to registration of devices with a registration server, for example associated with a cloud-based computing service.

BACKGROUND

Especially with the increasing popularity of remote working, it is becoming more common for offices and other working spaces to use so-called "hotdesking" systems, whereby instead of each employee or other user having his or her own assigned desk there are multiple desks with docking systems and peripheral devices that can be used by any user. Many other spaces such as cafes and libraries are also beginning to use similar technology to allow users to rent a place to connect their own devices to use peripheral devices, such as displays, printers, etc. However, setting up such docking systems and peripheral devices can be time consuming and costly, especially in cases where there are many desks located over a wide area, such as in large offices with multiple rooms and sometimes multiple floors.

Setting up such docking stations and peripheral devices often also requires each one to be registered, and, in some cases, authenticated, and their position to be associated with the registration, for example, so that a docking station at a particular location can be reserved in advance, when a user is more concerned with the location, rather than the particular docking system. Registering each such docking station and associating it with its location can be very time consuming if there are a large number of docking stations, for example hundreds, or even thousands, to be set up, as may be the case in a new office establishment.

SUMMARY

This Summary is provided to introduce in a simplified form a selection of concepts that are further described below in the Detailed Description. This Summary is not intended to identify key features or essential features of the claims subject matter, nor is it intended to limit the scope of the claimed subject matter.

A method performed by a device registration server is disclosed. The method may involve receiving, from a mobile device, location information and data associated with at least one image displayed on at least one display coupled to and co-located with a device, the image being captured by the mobile device, wherein the location information indicates a location of the mobile device when the at least one image was captured by the mobile device. The method may then involve determining that the data received from the mobile device includes device information associated with the device. The device coupled to and co-located with the at least one display may then be registered based on the location information and the data received from the mobile device.

There is also disclosed a device registration system comprising a processing system and a memory storing instructions that, when executed by the processing system, cause the device registration system to perform the method disclosed above.

A method of enabling registration of a device having at least one display connected to and co-located with the device is also disclosed. The method may involve displaying, on the at least one display, at least one image providing device information including at least a device identifier for the device. A mobile device is used to record the at least one image displayed on the at least one display. Location information may then be transmitted, together with the recorded at least one image or the device information extracted from the recorded at least one image to a device registration server, where the location information includes a location of the mobile device when the at least one image was recorded by the mobile device.

There is also disclosed a method for facilitating registration, by a device registration server of a cloud computing service, of a plurality of devices situated in a building, each device of the plurality of devices being connected to at least one display co-located with the device, each display displaying at least one image providing device information including at least a device identifier for the device connected to and co-located with the display. A mobile device is moved about the building and is configured to capture the at least one respective image displayed on the plurality of displays. At least one respective image captured from each of the displays, or respective device information extracted from each of the respective captured images, may be associated with respective location information indicating the location of the mobile device at a time when the at least one respective image is captured from each of the displays. The respective images, or the respective device information, and the associated respective location information may be transmitted to the device registration server in order to enable the device registration server to register the plurality of devices together with their respective physical locations.

The device may be a docking station. The mobile device may include a camera with which the image may be recorded. The camera may be a digital camera, or may be a camera of a cell phone or be located in a drone, for example.

BRIEF DESCRIPTION OF THE DRAWINGS

The present embodiments are illustrated by way of example and are not intended to be limited by the figures of the accompanying drawings, of which.

DETAILED DESCRIPTION

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

Figure 1:
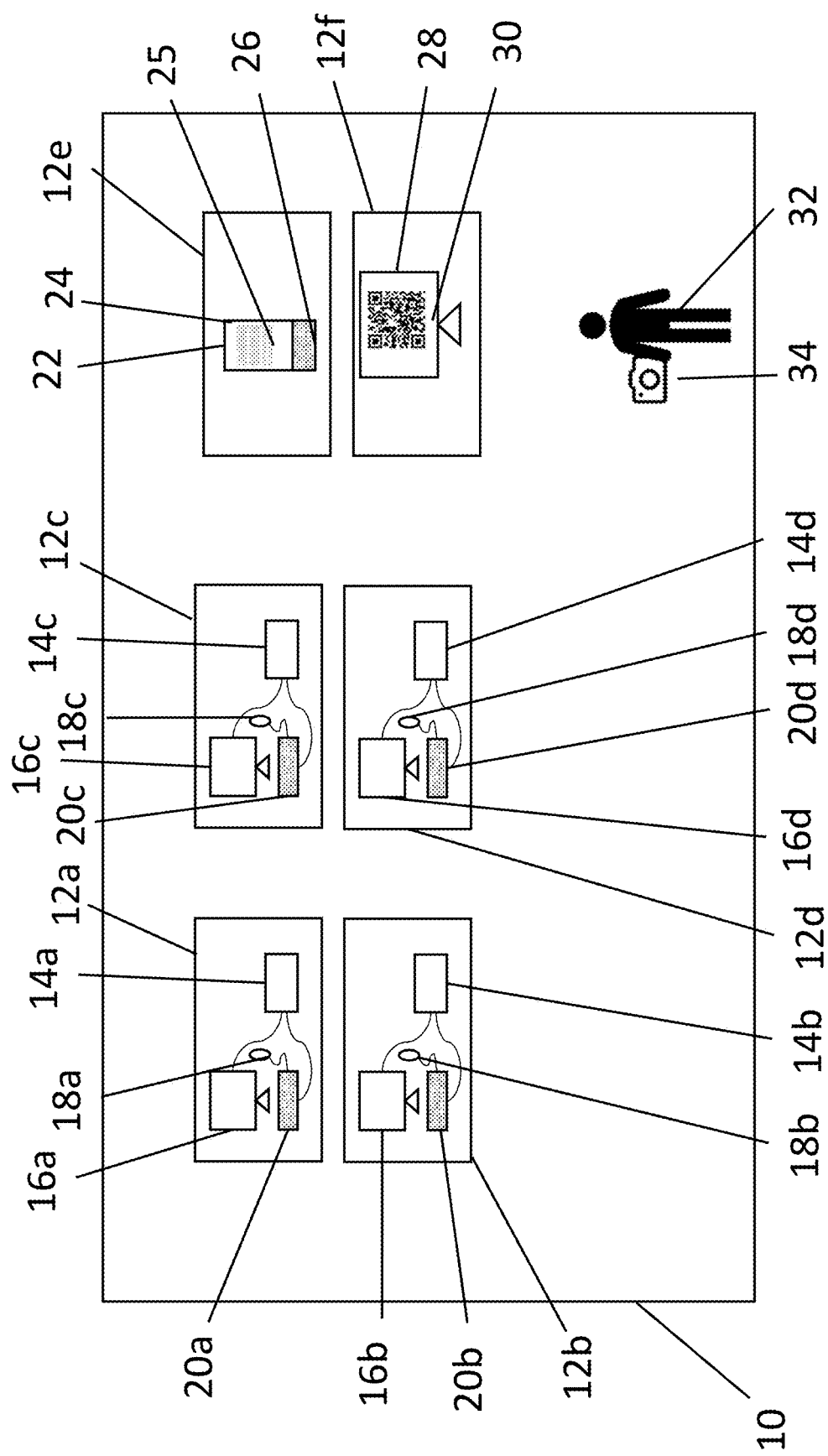
FIG. 1 shows an office layout with six hotdesking stations.

FIG. 1 shows an example office layout 10 with six desks 12a-12f. Four of the desks 12a-12d include a docking station 14a-14d and a collection of peripheral devices, which are shown here as a monitor 16a-16d, a mouse 18a-18d, and a keyboard 20a-20d. A user can connect his or her computing device to a docking station 14a-14d in order to interact with the peripheral devices and access the network, which may also allow access to the internet, a server in a server room, and/or a printer at a printer station.

However, any devices that can be connected to a network, and that need to be registered with it may be used instead of docking stations. For example, desk 12e is shown with a cell phone 22, with a display 24 having an image portion 25 and a keyboard portion 26. Desk 12f is shown with a computer 28 integrated with a touch screen 30. It will be appreciated that any other device that can be registered to a network may be used, provided it has a screen, or is connected to a display. In some embodiments, a desk may also or instead have a "thin client" which allows a user to access applications run centrally on a server or the internet, possibly via a virtual machine, by simply logging onto the thin client. It may be possible for a docking station on a desk to be dual-purpose such that when a computing device is connected it acts as a docking station, but it can also act as a thin client, making the connection of a computing device unnecessary. For the present purposes, thin clients and dual-purpose docking stations will be described as docking stations and function in a similar way.

Also illustrated in FIG. 1 is a mobile device, such as a camera 34 being carried by a person 32. The camera may be a digital camera, or may be a camera of a cell phone or other mobile device that can record images. The person 32 can walk around the office environment and, using the camera 34, record images that are displayed on the monitors 16a-16d, on the display 24 of the cell phone, and/or on the touch screen 30 of computer 28. In some cases, the camera 34 may be attached to a drone, rather than being carried by a person, or may be otherwise moved so as to be able to record the images being displayed.

Figure 2:
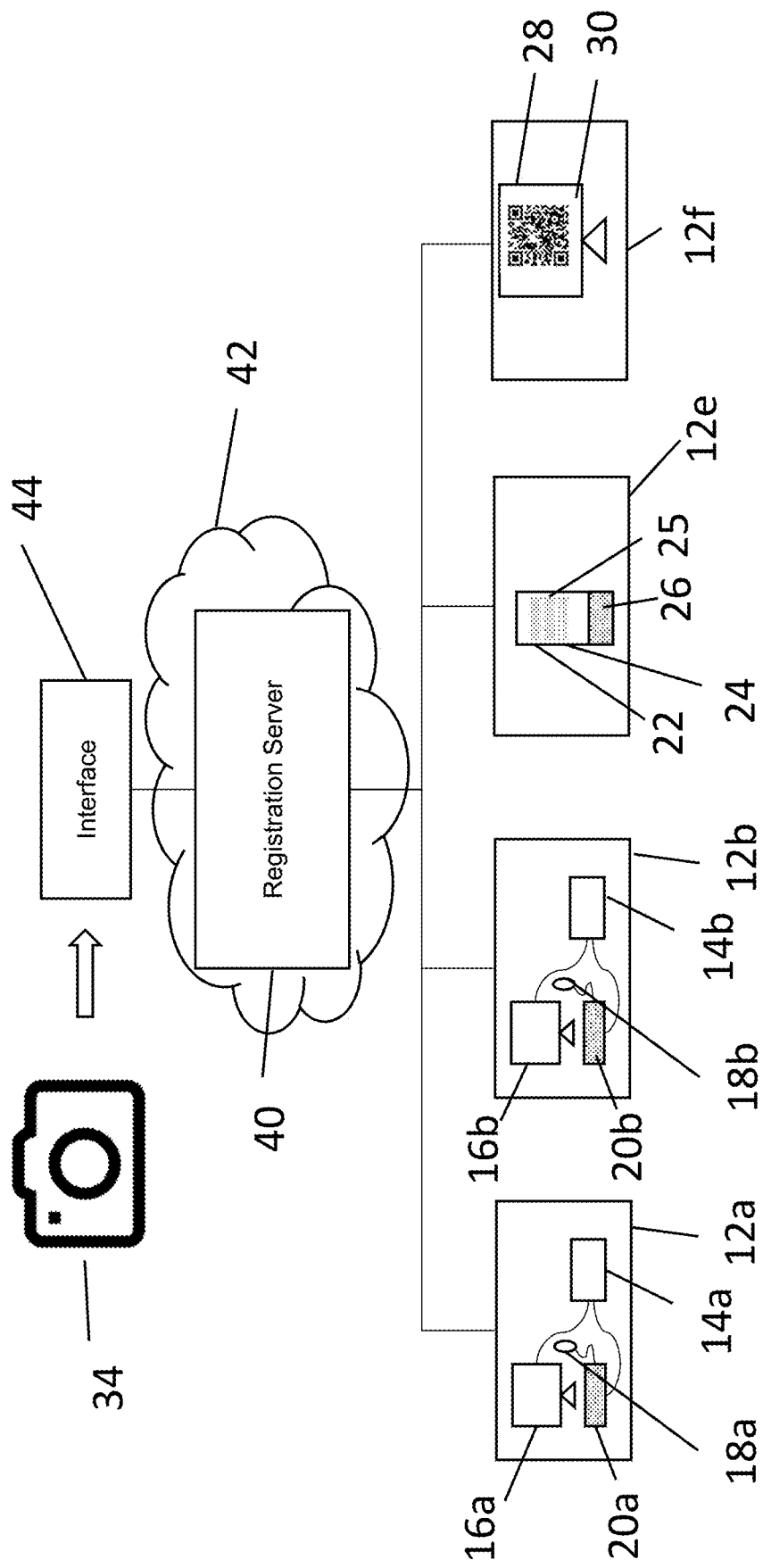
FIG. 2 shows a network topography of an office.

FIG. 2 shows an example network topography with four of the desks shown in FIG. 1. The two desks 12a-12b each have a monitor 16a-16b, mouse 18a-18b and keyboard 20a-20b connected to a docking station 14a, 14b. Each docking station 14a-14b is connected to a registration server 40 across a network. The registration server 40 may be a server controlled by the owner of the office and may be on-site or off-site accessible across an external network, including the internet. Alternatively, the registration server 40 may be part of a cloud-based computing service 42.

The registration server 40 can interface with the docking stations 14a-14b and other devices 22, 28 in order to register the docking stations 14a-14d and to authenticate them, if necessary. The registration server 40 may be part of a cloud-based computing service 42 and may also control the capabilities of the docking stations and the connected peripherals or may control the network access and content that the devices are allowed to connect to. The registration server 40 may also be connected to an interface 44 which allows it to receive data from the camera 34, or from a device to which the data from the camera 34 was previously downloaded to.

Figure 3:
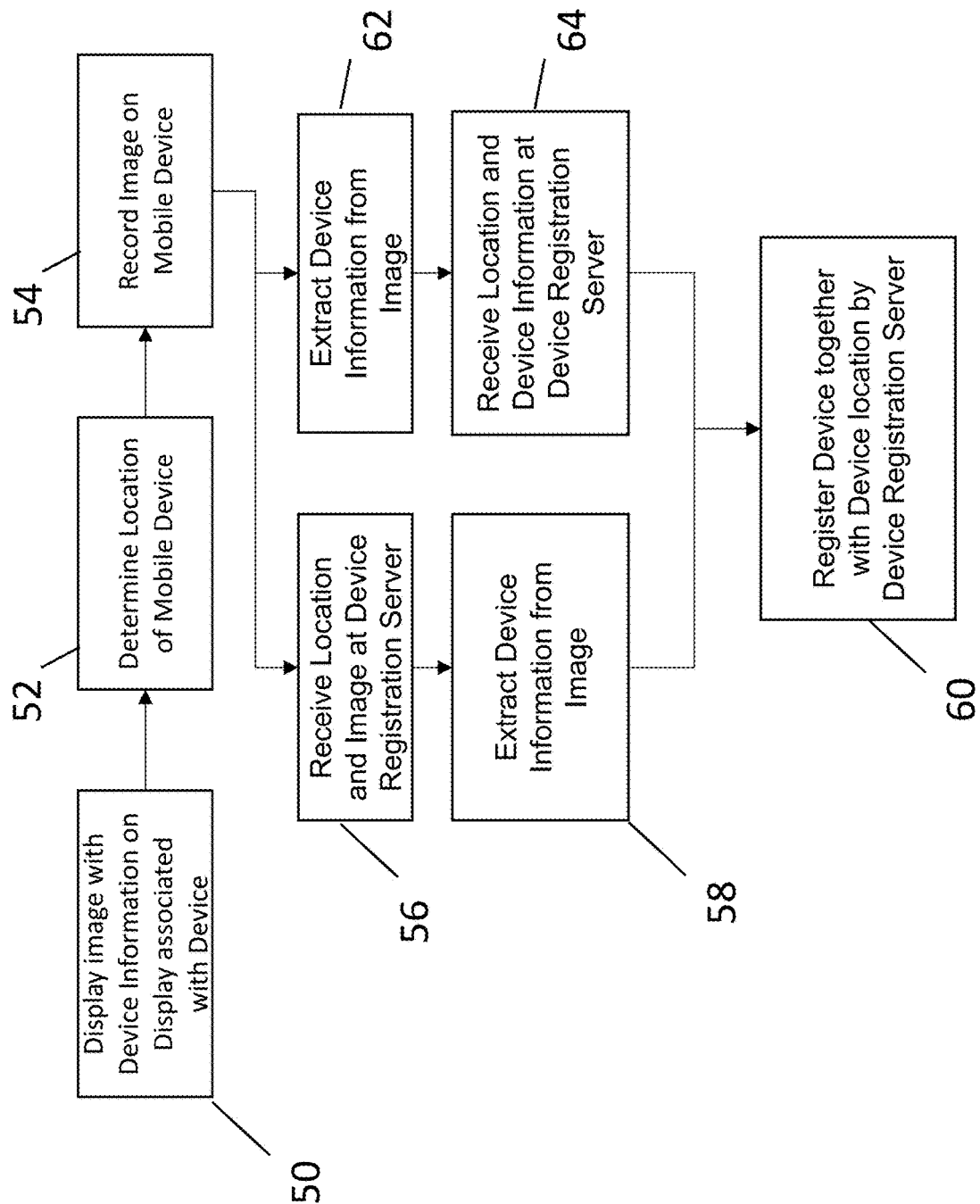
FIG. 3 shows an example process for initial registration of a docking station or other device.

FIG. 3 shows an example method that may be used to register one or more devices by the registration server. Each device, whether a docking station or other device, is configured to display, on its associated monitor or screen, an image that includes device information associated with the associated device. The device information may include a device identifier, and may further include other information regarding the device, such as a group identifier indicating a group of devices that the device is part of. The device identifier may be a unique identifier for the device, such as a serial number of the device. A group may be a department, e.g. accounts, marketing, etc, or may be some other grouping, such as employees, guests, etc. For example, all docks in the Finance department may be arranged to display an image with the group identifier encoded into the image. Devices can be grouped by anything including location such as department or country. The device information may also include device location information provided by a local server based on mappings of connections to which the device is connected. The device information may also include various parameters and information associated with the device, such as a feature of the device, peripheral devices connected to the device (such as a keyboard, a mouse, a monitor, USB devices), a vendor of the device, a model number of the device, a registration status of the device and/or registration details of the device.

The image may be generated by the device itself, or may be generated by a local server to which the device is connected, or by a remote server, for example, in a cloud computing service, to which the device is connected. A local application, for example on a local server, may instruct docking stations or other devices on a local area network or virtual private network, to display a unique image on the connected display. Such instructions may be sent to, for example, either all devices or only those in specific address ranges, or only those in specific groups as mentioned above. An image may include the device information in any suitable format. It could, for example be a QR code, as shown on touch screen 30, or may be text information, as shown in image portion 25 of display 24. Furthermore, an image, as used herein, may include a series of images to uniquely identify either a single device or a group of devices.

As mentioned, at block 50, the image is displayed on the display or screen of the device. At block 52, a location of the mobile device 34 is determined and, at block 54, the mobile device 34 is then used to record the image from the display or screen. At block 56, the image recorded at a particular location is associated with the location and the recorded image and information regarding the associated location are transmitted to, and received by, the registration server 40. At block 58, the registration server 40 then extracts the device information from the image, and at block 60, registers the device associated with the display or screen in which the image was displayed with the location associated with that image. Alternatively, if the mobile device has the capability to do so, at block 62, it may extract the device information from the recorded image and associate it with the particular location for that recorded image. At block 64, the mobile device can then transmit the extracted device information, instead of the image, together with the location information, which is received by the registration server 40, where the device can be registered together with its location, as before at block 60. After registration of the device, the device may be instructed to, or automatically after a period of time, stop displaying the image.

The mobile device may be a camera, such as a digital camera, or may be a camera of a cell phone, which may capture the image and store it on memory in the camera or cell phone. The recorded image and the location information for that image may be associated with the particular recorded image. The location may be determined by using one or more of Global Navigation Satellite Systems (GNSS), such as the Global Positioning System (GPS), or by other means. For example, a cell phone's location may be determined using cellular triangulation and provided to the mobile device. The location may be determined using internet-based location, if the mobile device is connected to the internet, or using internal features of the mobile device, such as a compass and/or a gyroscope. The location may be manually entered into the mobile device by a person operating the mobile device to record the image by a user interface of the mobile device, in some circumstances.

Information regarding the location of the mobile device at the time an image is recorded is associated with the image. In some cases, the location information may include display location information for the display or screen on which the image being recorded is displayed. This may provide more accurate information as to the location of a particular device than provided by a location of the mobile device recording the image, depending on the accuracy of the location information and the distance between the mobile device and the display or screen on which the image is displayed. The display location information may be determined based on recordal information of the mobile device when the image is being recorded. The recordal information may include one or more of a direction of focus of the mobile device, a focal length of the mobile device, image size of the recorded image, angles of focus and displayed images, and/or display screen size information, which may provide an indication of distance when the actual display screen size is known. Such an actual display screen size and other aspects of the display or screen may form part of the device information encoded into the image. The mobile device may have an application executing thereon which facilitates detecting appropriate images and recording them.

The transmission of the recorded image or the device information may be direct or indirect. For example, if the image or device information is stored on a memory card of the mobile device, the image or device information may first be downloaded to a computer, from which the image or device information may be transmitted to the registration server. Of course, in the situation where there are a number of images recorded from a number of displays or screens, all the images or all the device information may be collected and transmitted together to the registration device, directly or indirectly.

In some embodiments, therefore, a plurality of devices may be situated in a building, each particular device of the plurality of devices being connected to an associated particular display co-located with the particular device. Each associated particular display may display an image providing device information including at least the device identifier for the associated particular device. The mobile device may then be moved about the building to record the images displayed on the associated particular displays. As mentioned, the mobile device may be carried and operated by a person as the person moves about the building. Alternatively, in some circumstances, it may be possible to mount the mobile device to a drone or other transportation device and operate it remotely. A respective recorded image recorded from each of the particular displays, or respective device information extracted from each of the respective images, may then be associated with respective location information indicating the location of the mobile device at a time when the respective image is recorded from each of the particular displays. The respective images, or the respective device information, and the associated respective location information may then be transmitted, directly or indirectly, to the device registration server of a cloud computing service in order to enable the cloud computing service to register the plurality of devices together with their respective physical locations.

The advantages of including location information together with the registration of a device in the cloud are that it reduces the need for further physical visits to determine where a particular dock is located. It also improves the usefulness of other collected data, if the location is known, and facilitates grouping devices, such as by department through the use of IP addresses in private or virtual networks.

Figure 4:
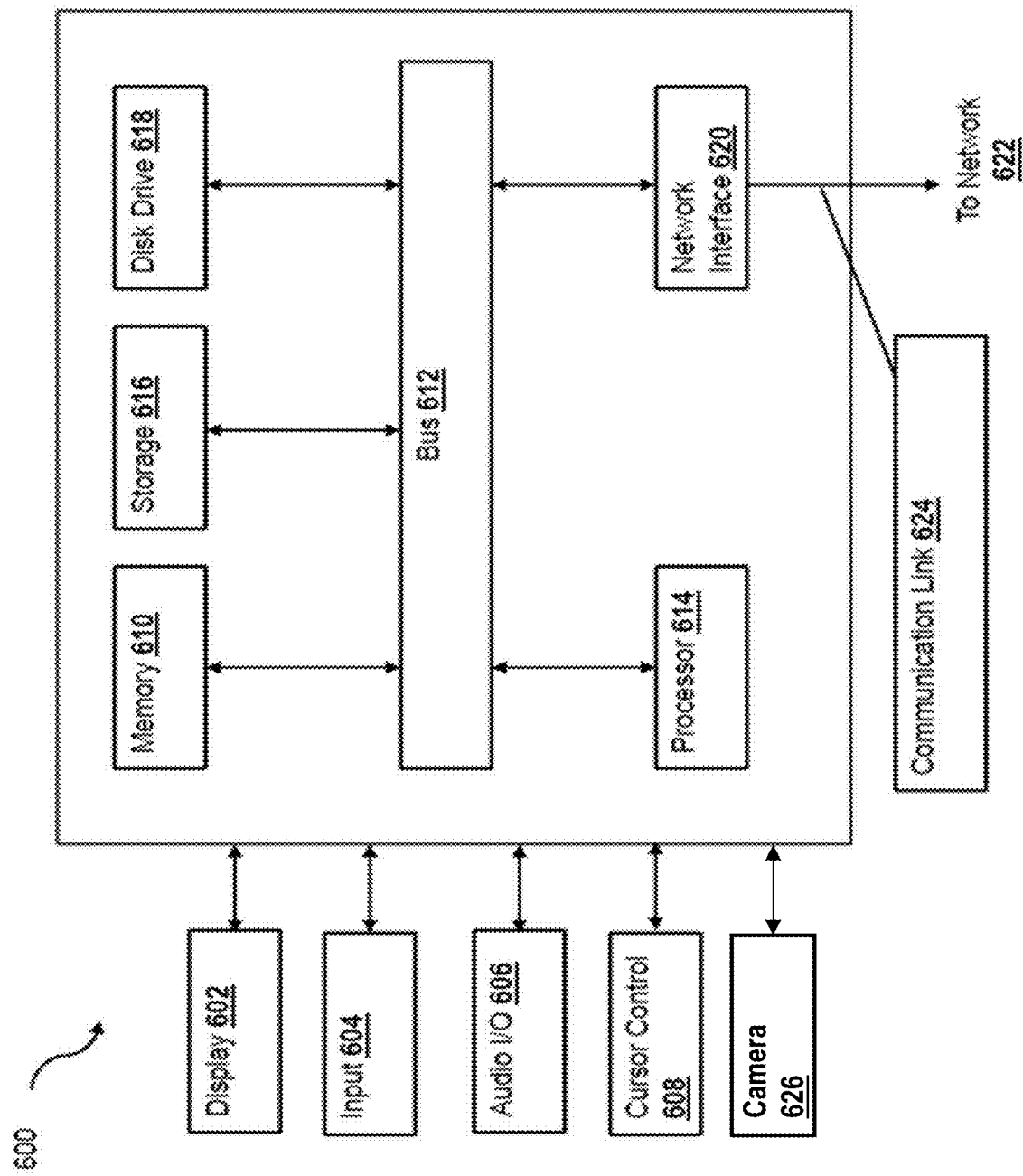
FIG. 4 is a block diagram of a device suitable for implementing one or more embodiments of the present disclosure.

FIG. 4 is a block diagram of a device 600 suitable for implementing one or more embodiments of the present disclosure, including the docking station 14 or the mobile device 34. In various implementations, the docking station 14 may be adapted for wireless or wired communication, and each of the docking station 14 or the mobile device 34 may include a network-connected computing device. Thus, it should be appreciated that the docking station 14 and/or the mobile device 34 may be implemented as the computer system 600 in a manner as follows.

The computer system 600 includes a bus 612 or other communication mechanism for communicating information data, signals, and information between various components of the computer system 600. The components include an input/output (I/O) component 604 that processes a user action, such as selecting keys from a keypad/keyboard, selecting one or more buttons or links, etc., and sends a corresponding signal to the bus 612. The I/O component 604 may also include an output component, such as a display 602 (which may, in some embodiments, be the monitor 16 or the display 24 or 30) and a cursor control 608 (such as a keyboard, keypad, mouse, etc.). A camera 626, which may be the camera 34, may also be provided. An optional audio input/output component 606 may also be included to allow a user to use voice for inputting information by converting audio signals. The audio I/O component 606 may allow the user to hear audio. A transceiver or network interface 620 transmits and receives signals between the computer system 600 and other devices via network 622. In one embodiment, the transmission is wireless, although other transmission mediums and methods may also be suitable. A processor 614, which can be a micro-controller, digital signal processor (DSP), or other processing component, processes these various signals, such as for display on the computer system 600 or transmission to other devices via a communication link 624. The processor 614 may also control transmission of information, such as cookies or IP addresses, to other devices.

The components of the computer system 600 also include a system memory component 610 (e.g., RAM), a static storage component 616 (e.g., ROM), and/or a disk drive 618 (e.g., a solid-state drive, a hard drive). The computer system 600 performs specific operations by the processor 614 and other components by executing one or more sequences of instructions contained in the system memory component 610.

Executable logic for performing any described functions may be encoded in a computer readable medium, which may refer to any medium that participates in providing instructions to the processor 614 for execution. Such a medium may take many forms, including but not limited to, non-volatile media, volatile media, and transmission media. In various implementations, non-volatile media includes optical or magnetic disks, volatile media includes dynamic memory, such as the system memory component 610, and transmission media includes coaxial cables, copper wire, and fiber optics, including wires that comprise the bus 612. In one embodiment, the logic is encoded in non-transitory computer readable medium, such as a magnetic or optical disk or other magnetic/optical storage medium, or FLASH or other solid-state memory (e.g. integrated into a device or in the form of a memory card). In one example, transmission media may take the form of acoustic or light waves, such as those generated during radio wave, optical, and infrared data communications.

In various embodiments of the present disclosure, execution of instruction sequences to practice the present disclosure may be performed by the computer system 600. In various other embodiments of the present disclosure, a plurality of computer systems 600 coupled by the communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another.

The above embodiments and examples are to be understood as illustrative examples. Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A method performed by a device registration server, comprising:
   receiving, from a mobile device, location information and data associated with at least one image displayed on at least one display coupled to and co-located with a docking station, the image being captured by the mobile device, wherein the location information indicates a geographic location of the at least one display when the at least one image was captured by the mobile device, the location information based at least in part on a location of the mobile device relative to the at least one display;
   determining that the data received from the mobile device includes device information associated with the docking station, the device information comprising information about one or more peripheral devices coupled to the docking station; and
   registering the docking station coupled to and co-located with the at least one display based on the location information and the data received from the mobile device.

2. The method of claim 1, wherein the mobile device comprises a camera, and wherein the at least one image displayed on the at least one display is captured by the camera.

3. The method of claim 1, wherein the device registration server is associated with a cloud computing service.

4. The method of claim 1, wherein the captured at least one image is associated with a location of the mobile device.

5. The method of claim 1, further comprising determining, by the mobile device, the geographic location of the mobile device.

6. The method of claim 5, wherein the location information includes one or more of satellite positioning information, cellular phone network triangulation information, internet-based location information, information generated by a compass of the mobile device, and information generated by a gyroscope of the mobile device.

7. The method of claim 1, wherein the location information is input by a user of the mobile device.

8. The method of claim 1, wherein the data comprises image data associated with the at least one image, the method further comprising extracting the device information from the image data.

9. The method of claim 1, wherein the device information comprises at least one of:
   a group identifier indicative of a group of docking stations to which the docking station belongs;
   an identifier of a plurality of docking stations that are used by a single business entity or part thereof;
   an identifier of a plurality of docking stations that are connected to a predetermined communications point;
   an identifier of a plurality of docking stations that are located within a same general location;
   device location information provided by a local server;
   features of the docking station;
   a vendor of the docking station;
   a model number of the docking station;
   a registration status of the docking station; or registration details of the docking station.

10. The method of claim 1, wherein the at least one image is provided by:
    the docking station;
    the mobile device to which the docking station is connected;
    a local server to which the docking station is connected; or
    a remote server of a cloud computing service to which the docking station is connected.

11. The method of claim 1, wherein the data comprises the device information as extracted from the at least one image by the mobile device.

12. The method of claim 1, wherein the location of the mobile device relative to the at least one display is determined based on recordal information of the mobile device, the recordal information including one or more of:
- direction of focus of the mobile device;
- focal length of the mobile device;
- image size of the recorded image;
- angles of focus and displayed images; or
- display screen size information.

13. A device registration system comprising:
a processing system; and
a memory storing instructions that, when executed by the processing system, cause the device registration system to:
receive, from a mobile device, location information and data associated with at least one image displayed on at least one display coupled to and co-located with a docking station, the image being captured by the mobile device, wherein the location information indicates a geographic location of the at least one display when the at least one image was captured by the mobile device, the location information based at least in part on a location of the mobile device relative to the at least one display;
determine that the data received from the mobile device includes device information associated with the docking station, the device information comprising information about one or more peripheral devices coupled to the docking station; and
register the docking station coupled to and co-located with the at least one display based on the location information and the data received from the mobile device.

14. The device registration system of claim 13, wherein the location information includes one or more of satellite-based positioning system information, cellular phone network triangulation information, internet-based location information, information generated by a compass of the mobile device, and information generated by a gyroscope of the mobile device.

15. The device registration system of claim 13, wherein the data comprises either:
the device information as extracted from the at least one image by the mobile device; or
image data associated with the at least one image, and the instructions, when executed by the processing system, further cause the device registration system to extract the device information from the image data.

16. The device registration system of claim 13, wherein the device information comprises at least one of:
- a group identifier indicative of a group of docking stations to which the docking station belongs;
- an identifier of a plurality of docking stations that are used by a single business entity or part thereof;
- an identifier of a plurality of docking stations that are connected to a predetermined communications point;
- an identifier of a plurality of docking stations that are located within a same general location;
- device location information provided by a local server;
- features of the docking station;
- a vendor of the docking station;
- a model number of the docking station;
- a registration status of the docking station; or
- registration details of the docking station.

17. A method for facilitating registration, by a device registration server of a cloud computing service, of a plurality of docking stations situated in a building, each docking station of the plurality of docking stations being connected to at least one display co-located with the docking station, each display displaying at least one image providing device information including at least a device identifier for the docking station connected to and co-located with the display, the method comprising:
moving a mobile device about the building to capture the images displayed on the at least one display;
associating respective device information extracted from each of the respective captured images, the respective device information comprising information about one or more peripheral devices coupled to a corresponding docking station with respective location information indicating a geographic location of the at least one display at a time when the at least one respective image is captured from each of the at least one display, the location information based at least in part on a location of the mobile device relative to the at least one display; and
transmitting the respective device information, and the associated respective location information to the device registration server in order to enable the device registration server to register the plurality of docking stations together with their respective physical locations.

18. The method of claim 17, wherein the mobile device comprises a drone with a camera attached thereto.

* * * * *